Dec. 30, 1924.

H. M. SPECHT

VEHICLE WHEEL

Filed July 18, 1923

1,521,257

INVENTOR
H. Mortimer Specht
BY
ATTORNEY

Patented Dec. 30, 1924.

1,521,257

UNITED STATES PATENT OFFICE.

HARRY MORTIMER SPECHT, OF PELHAM, NEW YORK.

VEHICLE WHEEL.

Application filed July 18, 1923. Serial No. 652,207.

*To all whom it may concern:*

Be it known that I, HARRY MORTIMER SPECHT, a citizen of the United States, and a resident of Pelham, county of Westchester, State of New York, have invented a new and useful Improvement in a Vehicle Wheel, of which the following is a specification.

This invention relates to vehicle wheels, and particularly to wheels of the disk type, and it also is in the nature of a modification and improvement upon the construction shown in my previous patent application filed August 14th, 1922, Serial Number 581,697.

This disk type of wheel has been found in actual practice to possess great value for use on motor driven vehicles of all kinds; as a reduction in weight can be obtained without sacrificing any of the resiliency, strength or rigidity needed to cope with the stresses and strains arising out of high speed, heavy loads, rough roads and various other driving conditions.

The construction shown herein will permit the use of a light weight metal, and the cost of production can be kept down so that the device can be made and sold at a reasonable figure.

As described hereinafter and shown in the drawings, the disk surface of the wheel occupying the space between the rim and the hub, is formed with a series of corrugations and arranged in concentric, annular convolutions upon the surface of the wheel disk.

I have also found that by shaping the said annular corrugations so that the surfaces thereof are produced in curved or waving lines, I can obtain a wide range of resilience or rigidity and thereby provide means for taking up the jar, shock or vibration met with in locomotion and variable in accordance with actual existing conditions.

The said corrugations may be of any desired and practical diameter, the alternately convexed and concaved sections therein may have any desired and practical length, and the curved or waving surfaces of the said convexed and concaved sections may be formed with the curves or waves of any desired and practical length and width. For a heavy tire with a broad tread it might also be desirable to use two disk surfaces, made as described above and located between the rim and hub of the wheel which may be of the usual type.

I have discovered that wheels constructed on these principles possess a resilience which enable them to absorb or take up the vibrations or jars caused by any roughness or inequalities of the road bed. This resilience or elasticity is not obtained at the rim of the wheel but between the rim and the hub, thereby furnishing an additional smoothness and freedom from shock to that obtained from the use of cushion or pneumatic tires.

I have also discovered that in this type of wheel, the hub, under some conditions, and for a very brief period of time is slightly out of alignment with the plane of the disk surface, or a trifle removed from the exact centre of the disk, but that it practically immediately resumes its proper position in the said exact centre, and in perfect parallelism with the plane of the disk surface.

Broadly, my invention provides a practical way of utilizing a construction in which the wave lengths produced in the corrugations of the wheel disk may be designed to meet the particular needs of any and all types of the wheels required for light or heavy loads, smooth or rough roads or high or low speed. The main principle is elastic to the extent that under unusual conditions, a specially designed wheel structure for such unusual conditions entirely within the scope of my invention could readily be worked out and produced.

The width of the corrugations or the diameter of the channel or tube formed by the alternate convexing or concaving of the curved channels formed in this manner can be varied in the types disclosed in all of the drawings.

In the drawings herewith:—

Figure 1:
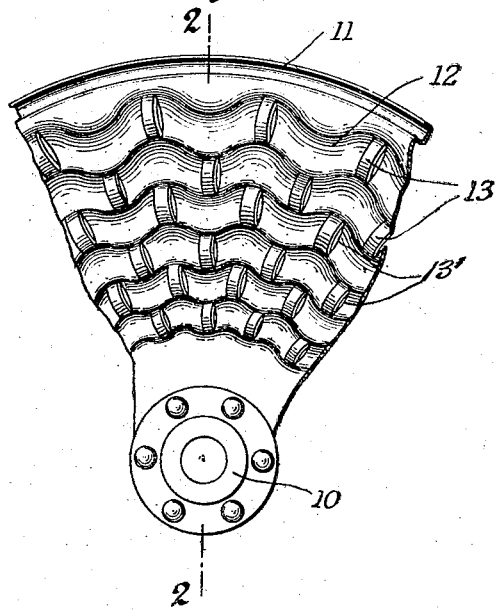
Fig. 1 is a fragmentary view of the disk surface, slightly tilted to show in perspective the corrugations located radially from the hub to the rim.
Figure 2:
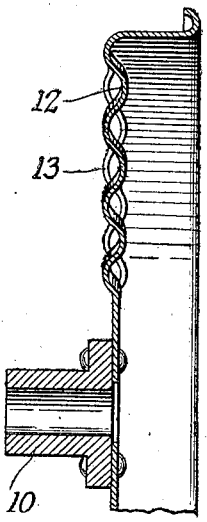
Fig. 2 is a sectional view on line 2—2 of Fig. 1.

As shown herewith the reference numeral 10 indicates the hub of the wheel and 11 is the rim of any desired and suitable type. In Fig. 1, the corrugations 12 are shown in curved or waved annular conformation with oppositely curved portions 13 cut at the point indicated by the reference numeral 13¹. In the drawing the structure is slightly tilted to show a perspective view of the construction at 13¹, the series of openings indicated by the said numeral 13¹ extending in staggered relation to one another from the hub to the rim of the wheel.

Figure 3:
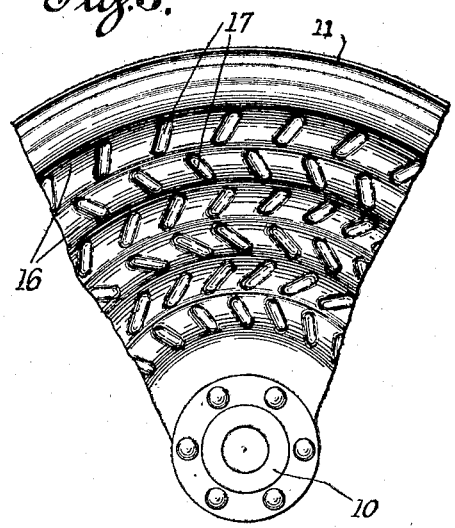
Fig. 3 is a modified form.

The modified form shown in Fig. 3 comprises the annular concentric corrugations 16 with depressions 17 of a cup or pan like nature stamped or embossed in the said corrugations or convolutions 16.

The forms shown herewith will serve to indicate the manner in which the use of curved or waved corrugated and alternately convexed and concaved surfaces may be utilized in the disk member of a wheel to take up between the rim and the hub the jars and shocks incidental to traffic and not always absorbed by the tires interposed between the road and the rim of the wheel. I do not desire to limit myself strictly to the forms of my invention shown herewith as there are many other forms within the scope and breadth of this disclosure.

I claim:—

1. In a vehicle wheel, a disk member adapted to be attached to the hub of the wheel and provided with a plurality of substantially parallel, annular, waved corrugations having struck up portions.

2. In a vehicle wheel, a disk member adapted to be attached to the hub of the wheel and provided with a plurality of substantially parallel circumferential corrugations having struck up portions.

3. In a vehicle wheel, a disk member adapted to be attached to the hub of the wheel and provided with a plurality of substantially parallel, annular, waved corrugations having struck up portions in staggered relation to one another.

4. In a vehicle wheel, a disk member adapted to be attached to the hub of the wheel and having a plurality of circumferential corrugations provided with a series of staggered portions in their surfaces.

H. MORTIMER SPECHT.

Witnesses:
EMMA J. MITCHELL,
WM. A. TIEDEMANN.